United States Patent Office 3,101,331
Patented Aug. 20, 1963

3,101,331
PREPARATION OF LACTAMS
Albin F. Turbak, New Providence, and Herbert K. Wiese, Cranford, N.J., assignors to Esso Research and Engineering Company, a corporation of Delaware
No Drawing. Filed June 14, 1961, Ser. No. 116,935
6 Claims. (Cl. 260—239.3)

The present invention relates to the preparation of lactams from oximes and the imidyl sulfate intermediates formed in the process. More particularly the invention concerns the use of complexes containing sulfur trioxide in the rearrangement of oximes to lactams.

The invention solves one of the most difficult problems in Beckmann rearrangement processes, namely how to control the violent reaction that occurs when it is carried out in the conventional manner. Many attempts have been made to curb the highly exothermic reaction, but these have been essentially unsuccessful. While some processes have partially reduced the violence of the reaction, it is still necessary to use a coolant, such as ice water, to prevent the temperature from rising too high and causing the formation of objectionable impurities that are difficult to remove.

It has now been found that when certain sulfur trioxide complexes, especially complexes of lower trialkyl phosphates and 5 and 6 membered cyclic ethers, are used in the Beckmann rearrangement process, the reaction takes place without the formation of excessive amounts of heat. In most instances the temperature of the reaction mixture does not exceed 50° or 60° C. when the initial sulfation temperature is not more than about 30° C. The aforementioned complexes are unique in that not all complexes of sulfur trioxide are useful in the process. For example, complexes of sulfur trioxide with pyridine, dimethylformamide and trialkyl amines produce tars instead of valuable lactam products.

In carrying out the process, oximes are contacted with a complex composed of sulfur trioxide and a phosphoryl compound or a sulfur trioxide stable ether in the liquid phase under approximately atmospheric pressure, preferably at temperatures not exceeding room temperature in the presence of an inert solvent. The temperature of the reaction mixture usually rises substantially above room temperature during the rearrangement. The molar proportion of sulfur trioxide to oxime should be about 1 or more, e.g. up to 2. Molar ratios of less than 1:1 can be employed but they are much less satisfactory.

A convenient initial temperature is one between about 0 and 30° C. It should be understood, however, that higher sulfating temperatures can be used in batch reactions, but of course such temperatures can sometimes result in the production of undesirable by-products that affect the salability of the final product. Broadly speaking, the temperature of the reaction mixture can range from as low as −30° C. to as high as 100° C. depending on how the reactants are admixed and, among other things, whether or not internal or external coolants are employed.

There are three principal reactions in the process, namely the preparation of the sulfate intermediate, the spontaneous conversion to imidyl sulfate and the hydrolysis of the imidyl sulfate to the lactam. The process can be represented by the following reactions:

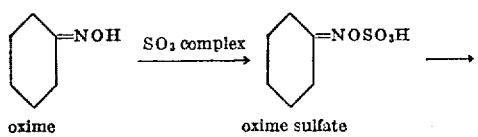

oxime      oxime sulfate

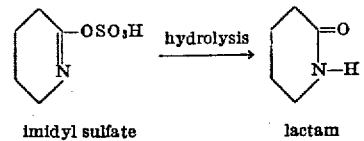

imidyl sulfate      lactam

Upon completion of the reaction in which the sulfate is formed, it is allowed to spontaneously rearrange, the intermediate imidyl sulfate solid product is separated and mixed with at least a stoichiometric amount of water at below room temperature, e.g. at 0° to 10° C., to release the lactam which is then dried and, in some instances, recrystallized from a suitable liquid hydrocarbon, such as n-hexane. Generally a relatively concentrated base solution, i.e. about a 10 to 40 wt. percent solution, is employed in order to simultaneously neutralize the acid hydrolysis product.

The oxime reactant, which can be an aromatic ketoxime, e.g. benzophenone oxime, an aromatic-aliphatic ketoxime, e.g. acetophenone oxime, an aliphatic ketoxime, e.g. acetoxime, or an alicyclic ketoxime, e.g. cyclohexanone oxime, usually contains 2 to 12 carbon atoms per molecule. Aldoximes, such as benzaldoxime, are dehydrated under conditions of this reaction and do not rearrange properly but form nitriles instead. Among the compounds containing an oxime radical that can be employed in the present process are benzophenone oxime, acetophenone oxime, acetoxime, methyl ethyl ketoxime, cyclododecanone oxime, and especially cyclohexanone oxime. Aside from the oxime moiety, the remainder of the molecule is usually hydrocarbon, i.e. alkyl, cycloalkyl or aromatic.

The molar ratio of sulfur trioxide to complexing agent is preferably 1:1, although other ratios, e.g. 0.75 to 2:1, can be employed. One of the benefits obtained by using sulfur trioxide complexed with an ether or phosphorus compound in a ratio of about 1:1 is that aromatic compounds containing oxime functions can be rearranged without substituting the aromatic ring. This is true of aromatics such as benzene, toluene, xylene, or any aromatic possessing lower sulfonating reactivity than mesitylene. A 1:1 $SO_3$/trialkyl phosphate complex does not react with benzene, toluene or xylene at temperatures up to 75° C. This is not true of $H_2SO_4$ or uncomplexed $SO_3$.

The compounds that are used to make the sulfur trioxide-containing complexes fall into two groups, i.e. phosphorus compounds and ethers that are not degraded by sulfur trioxide at the reaction temperature which is usually below about 75° C. The organic portion of the phosphorus compounds (exclusive of oxygen atoms attached to the phosphorus atoms) is generally hydrocarbon and is advantageously $C_1$ to $C_{12}$ alkyl or cycloparaffinic groups. While any phosphoryl-containing compounds, i.e. a pyrophosphate, phosphate, phosphonate or phosphinate, can be utilized to make the complex, the preferred pentavalent compounds are the phosphates, especially trialkyl phosphates wherein the number of carbon atoms in each alkyl group is between 1 and 4.

Suitable pentavalent hydrocarbonyl phosphorus compounds include triethyl phosphate, tributyl phosphate, tricyclohexyl-phosphate, methyl diethyl phosphonate, dimethyl ethyl phosphinate, tetrabutyl pyrophosphate, ethyldihydrogen phosphate, and dimethylhydrogen phosphate. Since sulfur trioxide complexes with the phosphoryl radical, the rest of the molecule serves as a diluent and its composition is not important unless it interferes with the formation of the complex. A large number of the complexes that can be used in the rearrangement reaction are represented by the following formula:

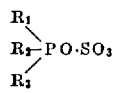

wherein $R_1$, $R_2$ and $R_3$ are $C_1$ to $C_{12}$ alkyl, alkoxy or hydrogen groups. In the case where R is hydrogen, it is necessary to use an extra mole of $SO_3$ to react with this position prior to forming a complex.

Among the saturated stable ethers that can be employed to prepare useful complexes are dioxane, tetrahydrofuran, tetrahydropyran, bis-beta-chloroethylether, and higher molecular weight aliphatic ethers, i.e. containing 6 to 10 or more carbon atoms, such as dipropyl ether, didecyl ether, etc. The halogenated aliphatic ethers are more stable than their alkyl oxide counterparts and therefore they can be used with less difficulty. Of the saturated cyclic ethers, which contain only carbon, hydrogen and oxygen, dioxane is preferred. The monocyclic ethers can have low molecular weight alkyl groups, e.g. ethyl radicals, attached to the carbon atoms in the ring and they usually contain a total of 4 to 10 carbon atoms.

The complex is prepared by simply mixing about equimolar amounts of sulfur trioxide and the complexing agent in a suitable inert solvent, such as dichloroethane, at temperatures up to 50° C. and atmospheric pressure. An excess of complexing agent, e.g. up to 20% excess, can be employed, if desired, but this is usually undesirable. Likewise excess sulfur trioxide can be employed, e.g. up to 2 moles per mole of complexing agent. If an ether is used to make the complex, it is advisable to precool the mixture to about 5° to 10° C. prior to adding the sulfur trioxide so as to avoid the formation of excessive heat.

Some of the complexes are insoluble in the inert saturated halogenated organic liquids that are generally used as solvents in their preparation. Their insolubility in the solvent does not seem to adversely affect their ability to react and therefore the complex can be utilized in slurry form in the rearrangement reaction. Examples of some of the lower molecular weight aliphatic saturated chlorinated and brominated solvents that can be used to make the complex as well as in the rearrangement reaction are chloroform, carbon tetrachloride, dibromoethane and dichloroethane. It is not necessary to use solvents in either reaction, but because they assist in the dissipation of the heat of reaction and facilitate the handling of reactants their use is recommended. For instance, the oxime reactant can be dissolved in a portion of the solvent and added slowly with stirring to the complex dissolved or slurried in the balance of the solvent.

The quantity of solvent used to prepare the complex or rearrange the oxime varies according to the procedure used. In general about 1 to 50 parts by weight of solvent is utilized per part of the reactants. The use of only a small amount of solvent in the rearrangement reaction is sometimes beneficial because it facilitates the recovery of the product, which otherwise dissolves in the solvent. By limiting the amount of solvent, the product in many instances can be precipitated by subsequent cooling.

In order to avoid color formation and product contamination, the reactants used to make the complexes as well as those utilized in the rearrangement reaction should be contacted slowly, e.g. by adding one of the reactants, preferably the oxime, dropwise or in a small stream. Sometimes the reaction starts almost immediately and continues until it is complete which is about the time when all of the reactants have been added. However, there is usually an induction period in the rearrangement reaction ranging from a few minutes to an hour or more. Occasionally the reaction mixture does not warm up until after all of the reactants have been charged to the reaction zone. Once the reaction starts, it is generally complete in about 10 to 60 minutes.

Upon completion of the reaction in which the oxime is rearranged, the lactam product can be recovered by neutralizing the reaction mixture with an alkaline substance, such as aqueous ammonia or caustic, and extracting the neutralized mass with an organic hydrocarbon or halogenated solvent, such as chloroform or benzene, in the conventional manner. The solvent is separated from the lactam by simply evaporating it on a steam bath or another heat producing means under atmospheric or reduced pressure. If desired, prior to neutralization the reaction mixture can be admixed with an inert lower molecular weight organic nonsolvent, such as petroleum ether, diethyl ether, heptane, pentane or any other substance that will extract the complex and the solvent from the reaction mixture, in order to recover the sulfate products made by this process. The most practical non-solvents are aliphatic saturated $C_4$ to $C_8$ ethers and hydrocarbons. The sulfate formed in the rearrangement reaction often becomes insoluble in the reaction mixture when large quantities of nonsolvent are added to the mixture. In the case where ethers are used as complexing agents, this sulfate can also be separated from the reaction by cooling. It is usually a stable hygroscopic solid at room temperature and therefore can be recovered by simply filtering the mixture and drying the solid material. The sulfate is soluble in water and therefore can be conveniently dissolved in ice water before adding the alkaline agent. Cold water is used to prevent ring opening of the lactam during neutralization with the base.

The lactams prepared in accordance with the present invention can be used for a variety of purposes, among which are preparation of amino acids by hydrolysis, and production of nylon by polymerization.

The process of the present invention can be carried out either batchwise or continuously. In a continuous process, the oxime is continuously charged to the reactor which contains the sulfur trioxide-containing complex at the reaction temperature, a portion of the liquid reaction mixture is continuously withdrawn from the reactor and the rearranged oxime is recovered by neutralization and extraction with a water insoluble suitable solvent. Any unreacted oxime recovered from the mixture is recycled to the reaction zone after it has been freed of any contaminants that interfere with the rearrangement reaction.

The following examples illustrate the invention.

*Example 1*

To 100 cc. of dichloroethane was added 17.6 g. (0.2 mole) of dioxane and thereafter 8.4 cc. of sulfur trioxide (0.2 mole) was added dropwise with stirring while the temperature was maintained at 5° C. to 10° C. by external cooling. The sulfur trioxide-dioxane complex separated from solution as a white solid.

The liquor was then brought to room temperature and 22.6 g. (0.2 mole) of cyclohexanone oxime dissolved in 50 cc. of dichloroethane was added in a slow stream with agitation while the reaction was maintained at 25° C.±2° C. by cooling. When about half of the oxime had been added, the solid dioxane complex became solubilized and after all of the oxime had been added, the liquor turned milky. Thereafter the temperature of the reaction mixture was permitted to rise to 48° C. over about a 25 minute period, after which time it dropped to room temperature. During the aforementioned period the appearance of the reaction mixture changed from milky white to a clear light yellow solution.

The reaction was cooled to 25° C. and the liquor was added with stirring to 400 cc. of petroleum ether. A heavy yellow oil layer separated and on further stirring the oil hardened to a cream colored powdery solid. This solid was filtered in a dry box through a frittered glass funnel and found to weigh 42.7 grams while still slightly moist with petroleum ether. It was identified as caprimidyl sulfate.

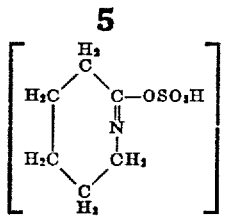

The solid was added to ice and dissolved very readily in the resulting ice-water slurry. This solution was stirred and kept at 0° to 5° C. while being neutralized (pH 7) with 40 wt. percent sodium hydroxide. The hydrolyzed mass was then extracted with three 100 cc. portions of chloroform. The chloroform was dried over anhydrous sodium sulfate, filtered and evaporated on a steam bath to give 16.5 g. (73% of theoretical) of a yellow-white solid on cooling. This solid was recrystallized from hot n-heptane to give a white crystalline solid having a melting point between 67° to 68° C. and was identified as caprolactam.

*Example 2*

An identical procedure to that of Example 1 was followed using 36.6 g. of triethyl phosphate (0.2 mole) in place of the dioxane. The sulfur trioxide-phosphate complex is soluble in the dichloroethane whereas the sulfur trioxide-dioxane complex is insoluble.

After addition of oxime solution was completed, spontaneous heating of the reaction mixture was noted. The mixture, which was clear throughout the reaction, rose to 39° C. over a half hour period and thereafter the temperature began to drop. Addition of the room temperature reaction mixture to 400 cc. of petroleum ether again yielded a heavy lower oil layer which on further stirring solidified to a creamy powdery solid again identified as imidyl sulfate. This was separated from the liquid by filtering in a dry box. The solid, which weighed 37.2 g. was slightly moist with petroleum ether. The sulfate was neutralized and chloroform extracted as in Example 1 and yielded 18.5 g. (82% of theoretical) of a white solid having a melting point of 68.5° C. that was identified as caprolactam. Evaporation of the water layer gave 24.6 g. of solid which was identified as inorganic (sodium) sulfate by treatment with barium chloride.

The petroleum ether in the filtrate was flashed and it was found that the residue was a high boiling substance from which 31.2 g. of triethyl phosphate (87.5% of starting material) was recovered by distillation at 68° C. and 2.3 mm. absolute pressure.

When the run was repeated using 0.5 mole of complexed sulfur trioxide per mole of oxime, no reaction occurred until the mixture was heated to 75° C. Only charred products were recovered. Thus the molar ratio of complexed $SO_3$ to oxime should be greater than .5:1.

*Example 3*

Another reaction was effected in the same manner as that described in Example 2 using 53.4 g. of tributyl phosphate (0.2 mole). This complex is also soluble in the chlorinated solvent. A spontaneous rearrangement again occurred but at a somewhat slower rate than for triethyl phosphate and reached a maximum temperature of 36° C. after all the oxime had been added.

Caprolactam (13.9 g.) was isolated and upon recrystallization, 13.2 g. of product having a melting point of 68° C. was recovered.

*Example 4*

The process described in Example 2 is repeated using 0.2 mole of dimethyl ethyl phosphinate instead of triethyl phosphate.

*Example 5*

The process described in Example 2 is repeated using 0.2 mole of triethyl phosphonate in place of triethyl phosphate.

*Example 6*

A run was made using acetophenone oxime in place of cyclohexanone oxime.

Triethylphosphate (13.7 g.) was dissolved in 50 cc. of dichloroethane and then 3.15 ml. (6.1 g.) of distilled $SO_3$ was added at 5° C.±2° C. The liquor was brought to 25° C. and 10.1 g. of acetophenone oxime (melting point 58°) dissolved in 50 cc. of dichloroethane was added at 25° C.±2° C. After addition was complete, cooling was removed, and the reaction proceeded spontaneously to 48° C. over a 50 minute period.

The reaction was then cooled and added to petroleum ether and a syrup-like layer formed. This petroleum ether was decanted and the syrup was dissolved in ice water and neutralized with 21.2 ml. of 20% NaOH to yield a white precipitate. The reaction mixture was extracted with three 110 cc. portions of chloroform. The chloroform extract was heated to evaporate the chloroform and as a result solid product was obtained. The product was recrystallized from hot diethyl ether to give crystals that melted at 114° C. which were identified as acetanilide. Thus, the procedure of the present invention can be used to rearrange aromatic ketoximes without sulfonating the aromatic ring.

*Example 7*

Example 1 was repeated up to the addition of the reaction mixture to the petroleum ether. In lieu of this, the mixture was cooled to 0° C. and a white solid separated. The solid was filtered off and shown to be pure caprimidyl sulfate which was then hydrolyzed to pure caprolactam in the above-described manner. The filtered liquor was then added to petroleum ether and worked up as described in the above-mentioned example to recover more caprolactam which of course had a lower purity.

The caprolactam obtained from the cooled precipitated solid (56% yield) was very pure and had a melting point of 69.5° C. without further recrystallization. The total yield of caprolactam was 81%.

*Example 8*

Example 2 was repeated using triethyl phosphate except that the reaction was then cooled as in Example 7.

No solid could be separated by cooling using the phosphate complexing agent.

To show the uniqueness of these complexes, the reaction was run as described in Example 1 except that dimethylformamide was used as the complexing agent.

Distilled dimethylformamide (14 g.) was dissolved in 100 cc. of dichloroethane, the solution was cooled to 10° C. and stirred while 8.4 cc. (0.2 mole) of sulfur trioxide was added dropwise. An exothermic reaction occurred and a white solid complex formed in the reaction vessel. After the addition of the sulfur trioxide was completed, the liquor was allowed to come to 25° C. and 22.69 (0.2 mole) of cyclohexanone oxime dissolved in 50 cc. of dichloroethane was added in a slow stream at 25° C. over a 15 minute period.

The solution became clear yellow. After two hours the temperature rose only to 28.5° C. Only tarry products were obtained. Similar results were obtained where pyridine was used as the complexing agent.

A run was made using benzaldoxime to show the effect of using an aldoxime instead of a ketoxime.

Triethylphosphate (0.2 mole) was dissolved in 100 cc. of dichloroethane and then 8.4 cc. (0.2 mole) of sulfur trioxide was added at 5° C.±2° C.

A solution of 24.2 g. (0.2 mole) of benzaldoxime in 50 cc. of dichloroethane was then added at 5° C.±3° C. with stirring and thereafter the external cooling means was removed. The reaction heated spontaneously to 42° C. over a 60 minute period. After no more heat was produced, the reaction was cooled to room temperature and added to excess petroleum ether. A clear heavy oil layer formed. The oil layer (74.0 g.) was dissolved in ice water and neutralized with 53.4 cc. of 20 wt. percent sodium hydroxide. This released an insoluble oil phase which was extracted three times with 100 cc. portions of diethyl ether, dried over anhydrous sodium sulfate, filtered, and evaporated to give 25.2 g. of oily product.

Upon distilling the product at 50° C. and 0.2 mm. pressure, 19.3 g. of a substance, which was shown by gas chromatography and infra-red analysis to be a mixture of triethyl phosphate and benzonitrile, was recovered.

Thus aldoximes form nitriles and do not form the rearranged amides as do ketoximes under these conditions.

In addition to being able to better control the temperature of the rearrangement reaction, other benefits are obtained by the use of these complexes in the Beckmann rearrangement reaction. For instance in the conventional rearrangement reaction in which sulfuric acid is used one of the principal drawbacks is the large amount of salt formed as a by-product. In the sulfuric acid method approximately three and one-half pounds of inorganic sulfate is produced per pound of lactam product. In the present process the amount of inorganic sulfate formed is substantially less. To be specific, in this preparation of caprolactam only about 1.2 pounds of ammonium sulfate is produced per pound of caprolactam.

Likewise, not every substance that complexes with sulfur trioxide is useful in the present process. For instance, as shown above, it has been found that the sulfur trioxide complexes made with dimethyl formamide and pyridine are substantially ineffective in the process. Thus only the above-described complexes have the capacity to produce lactams under the conditions described herein.

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. Process for making lactams which comprises contacting an oxime with sulfur trioxide complexed with an organic substance selected from the group consisting of phosphoryl-containing compounds and sulfur trioxide-stable ethers for a sufficient time to rearrange the oxime, hydrolyzing the rearranged oxime and thereafter recovering the lactam product.

2. Process according to claim 1 in which the oxime is cyclohexanone oxime.

3. Process according to claim 1 in which the substance complexed with sulfur trioxide is a lower trialkyl phosphate.

4. Process according to claim 1 in which the substance complexed with sulfur trioxide is a cyclic ether.

5. In the process for making lactams from oximes in accordance with the Beckmann rearrangement, the improvement which comprises reacting the oxime with sulfur trioxide complexed with about an equimolar amount of an organic substance selected from the group consisting of phosphoryl-containing compounds and sulfur trioxide-stable ethers in a molar proportion of approximately 1 for a sufficient time to rearrange the oxime.

6. Process for making caprolactam which comprises reacting cyclohexanone oxime with sulfur trioxide in a molar ratio of about 1:1 at —30 to 100° C. for about 10 to 60 minutes, said sulfur trioxide being complexed with an equimolar amount of a lower trialkyl phosphate, neutralizing the reaction mixture with an alkaline aqueous solution and recovering the caprolactam from the neutralized mixture.

References Cited in the file of this patent

UNITED STATES PATENTS 2,716,115    Blaser et al. _____ Aug. 23, 1955

FOREIGN PATENTS 1,046,623    Germany _____ Dec. 18, 1958

OTHER REFERENCES

Gould: "Structure and Mechanism in Organic Chemistry," pages 618–21 (Holt Dryden) (1959).

UNITED STATES PATENT OFFICE
CERTIFICATE OF CORRECTION

Patent No. 3,101,331                  August 20, 1963

Albin F. Turbak et al.

It is hereby certified that error appears in the above numbered patent requiring correction and that the said Letters Patent should read as corrected below.

Column 2, lines 1 to 7, the heterocyclic rings should appear as shown below instead of as in the patent:

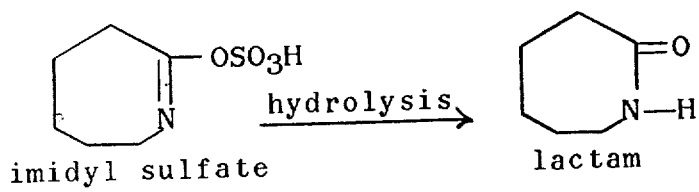

Signed and sealed this 12th day of May 1964.

(SEAL)
Attest:

ERNEST W. SWIDER
Attesting Officer

EDWARD J. BRENNER
Commissioner of Patents